United States Patent
Akoum et al.

(10) Patent No.: US 11,284,376 B2
(45) Date of Patent: Mar. 22, 2022

(54) DISTRIBUTED CONTROL INFORMATION FOR MULTIPLE PARTY COMMUNICATIONS FOR 5G OR OTHER NEXT GENERATION NETWORK

(71) Applicant: AT&T Intellectual Property I, L.P., Atlanta, GA (US)

(72) Inventors: Salam Akoum, Austin, TX (US); Xiaoyi Wang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/366,279

(22) Filed: Mar. 27, 2019

(65) Prior Publication Data

US 2020/0059914 A1 Feb. 20, 2020

Related U.S. Application Data

(60) Provisional application No. 62/765,140, filed on Aug. 17, 2018.

(51) Int. Cl.
| | |
|---|---|
| *H04W 72/04* | (2009.01) |
| *H04W 4/44* | (2018.01) |
| *H04W 72/12* | (2009.01) |

(52) U.S. Cl.
CPC ......... *H04W 72/0406* (2013.01); *H04W 4/44* (2018.02); *H04W 72/12* (2013.01)

(58) Field of Classification Search
None
See application file for complete search history.

(56) References Cited

U.S. PATENT DOCUMENTS

| | | |
|---|---|---|
| 8,458,353 B2 | 6/2013 | Krishnaswamy et al. |
| 9,253,753 B2 | 2/2016 | Rubin et al. |
| | (Continued) | |

FOREIGN PATENT DOCUMENTS

| | | |
|---|---|---|
| EP | 3373605 A1 | 9/2018 |
| WO | 2017133290 A1 | 8/2017 |
| | (Continued) | |

OTHER PUBLICATIONS

Lainghai, et al. "Applying Multiradio Access Technologies for Reliability Enhancement in Vehicle-to-Everything Communication." IEEE Access 6 (2018): 23079-23094. 16 pages. https://ieeexplo re.ieee.org/stamp/stamp.jsp?tp=&arnumber=8345295.

(Continued)

*Primary Examiner* — Alpus Hsu
*Assistant Examiner* — Camquyen Thai
(74) *Attorney, Agent, or Firm* — Amin, Turocy & Watson, LLP

(57) ABSTRACT

A distributed control information system for three party communications in a Vehicle to Everything (V2X) environment is disclosed. A first node can generate sidelink control information for a transmission between a second node and a third node. The first node can transmit the sidelink control information to the second node, and then the second node can transmit a portion of the sidelink control information relevant to the third node to the third node. In an embodiment, the first node can also send the third node portion of the sidelink control information to the third node directly, thus improving the reliability of the system. These transmissions can be performed via sidelink communications channels.

20 Claims, 10 Drawing Sheets

(56) References Cited

U.S. PATENT DOCUMENTS

| | | | |
|---|---|---|---|
| 9,538,374 B2 | 1/2017 | Kaufmann et al. | |
| 9,622,062 B1 | 4/2017 | Lin et al. | |
| 9,755,851 B2 | 9/2017 | Grimm et al. | |
| 9,986,596 B2 | 5/2018 | Stahlin et al. | |
| 2005/0041693 A1* | 2/2005 | Priotti | H04L 27/2675 370/503 |
| 2014/0177564 A1* | 6/2014 | Ma | H04W 72/1289 370/329 |
| 2014/0269419 A1* | 9/2014 | Han | H04L 25/03866 370/254 |
| 2015/0011230 A1* | 1/2015 | Noh | H04W 72/12 455/450 |
| 2015/0055567 A1* | 2/2015 | Narasimha | H04W 76/14 370/329 |
| 2015/0092706 A1* | 4/2015 | Chen | H04W 74/02 370/329 |
| 2015/0173048 A1* | 6/2015 | Seo | H04L 1/0031 370/329 |
| 2015/0195827 A1 | 7/2015 | Feng et al. | |
| 2015/0223217 A1* | 8/2015 | Chen | H04W 72/044 370/329 |
| 2015/0271859 A1* | 9/2015 | Huang | H04W 24/10 370/329 |
| 2016/0205714 A1* | 7/2016 | Morita | H04W 74/0833 455/450 |
| 2016/0212596 A1* | 7/2016 | Brahmi | H04W 72/042 |
| 2016/0285935 A1 | 9/2016 | Wu et al. | |
| 2016/0295624 A1* | 10/2016 | Novlan | H04W 72/04 |
| 2016/0374051 A1* | 12/2016 | Morita | H04W 72/12 |
| 2016/0374068 A1* | 12/2016 | Kim | H04W 74/0833 |
| 2017/0048822 A1* | 2/2017 | Lee | H04W 72/04 |
| 2017/0079085 A1* | 3/2017 | Yang | H04W 72/0446 |
| 2017/0238294 A1* | 8/2017 | Lim | H04L 5/0023 370/277 |
| 2018/0045832 A1 | 2/2018 | Ibrahim et al. | |
| 2018/0077668 A1 | 3/2018 | Chun et al. | |
| 2018/0093675 A1 | 4/2018 | Holub et al. | |
| 2018/0132208 A1 | 5/2018 | Pan et al. | |
| 2018/0139593 A1 | 5/2018 | Chun et al. | |
| 2018/0159935 A1 | 6/2018 | Cavalcanti et al. | |
| 2018/0184270 A1 | 6/2018 | Chun et al. | |
| 2018/0191551 A1 | 7/2018 | Chun | |
| 2018/0234895 A1 | 8/2018 | Shin et al. | |
| 2018/0242115 A1 | 8/2018 | Kim et al. | |
| 2018/0278385 A1* | 9/2018 | Wu | H04W 72/048 |
| 2018/0288588 A1 | 10/2018 | Uchiyama | |
| 2018/0310158 A1* | 10/2018 | Kimura | H04W 48/18 |
| 2018/0359619 A1* | 12/2018 | Ma | H04W 84/18 |
| 2018/0376525 A1* | 12/2018 | Feng | H04L 27/0014 |
| 2019/0364590 A1* | 11/2019 | Sartori | H04L 5/0051 |

FOREIGN PATENT DOCUMENTS

| | | |
|---|---|---|
| WO | 2017169111 A1 | 10/2017 |
| WO | 2017171806 A1 | 10/2017 |
| WO | 2018029023 A1 | 2/2018 |

OTHER PUBLICATIONS

Seigel, et al. "A Survey of the Connected Vehicle Landscape-Architectures, Enabling Technologies, Applications, and Development Areas." IEEE Transactions on Intelligent Transportation Systems 19.8 (2018): 2391-2406. 16 pages. https://ieeexplore.ieee.org/stamp/stamp.jsp?tp=& arnumber=8058008.

Li, et al. "Secure and Efficient Content Distribution in Crowdsourced Vehicular Content-Centric Networking." IEEE Access 6 (2018): 5727-5739. 13 pages. https://ieeexplore.ieee.org/stamp/stamp.jsp?tp=&arnumber=8123850.

Xu, et al. "Internet of Vehicles in Big Data Era." IEEE/CAA Journal of Automatica Sinica 5.1 (2018): 19-35. 17 pages. https://ieeexplore.ieee.org/stamp/stam p.jsp?tp=&arnumber=8232587.

Mueck, et al. "Software Radio Reconfiguration." ETSI White Paper No. 21, First edition, Oct. 2017. 23 pages. http://www.etsi.org/images/files /ETSIWhitePapers/etsi_wp21_RRS_FINAL.pdf.

* cited by examiner

DISTRIBUTED CONTROL INFORMATION FOR MULTIPLE PARTY COMMUNICATIONS FOR 5G OR OTHER NEXT GENERATION NETWORK

CROSS-REFERENCE TO RELATED APPLICATIONS

This application is a U.S. Non-Provisional patent application that claims the benefit of priority to U.S. Provisional Patent Application No. 62/765,140, filed Aug. 17, 2018 and titled "DISTRIBUTED CONTROL INFORMATION FOR THREE PARTY COMMUNICATIONS," the entirety of which application is incorporated herein by reference.

TECHNICAL FIELD

This disclosure relates generally to multiple party communications. For example, this disclosure relates to facilitating distributed control information for multiple party information for a 5G network with multiple slices, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating distributed control information for multiple party information is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
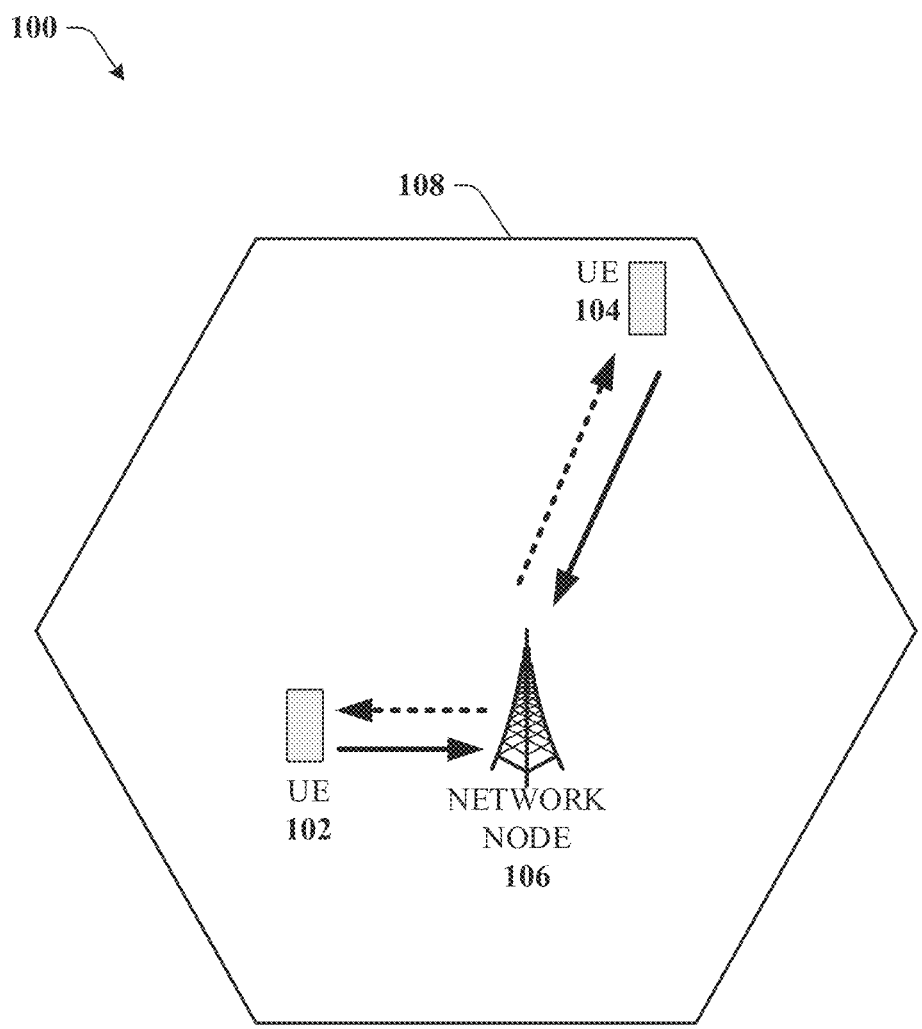
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate facilitating distributed control information for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate facilitating distributed control information for a 5G network. Facilitating distributed control information for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

A multiple (e.g., three) party communication framework for V2X can impose a hierarchical structure in a peer-to-peer network. In particular, in a three party communication framework, a given node, other than the transmitter and the receiver, can be designated to coordinate radio resource usage. The chosen node, dubbed "local manager", can be responsible for the scheduling and resource allocation among the nodes it manages. If the local manager is denoted as node-S, the transmitting nodes as node-T, the receiving node as node-R, the scheduling/resource allocation can be centralized at the node-S, while the data transmission is done by different nodes (node-T) in a distributed manner.

The aforementioned scenario does not take into account the case when node-T does not have a reliable connection to a given node-S, either because of blockage, or because of an edge effect, where node-T is far enough from any node-S to be reliably connected to it. The previous framework also does not address the case where multiple local managers are not dynamically coordinated, such that when node-R, for example, belongs to a different node-S than node-T. Thus, the control and data for node-R cannot be relayed through another node-S. This disclosure addresses the coordination between different node-S's and communication between node-T and node-R in the absence of a reliable connection between node-T and node-S.

In the general framework where a local manager node-S is elected and nodes are reliably covered by node-S, the procedure can be described as follows. The Node S can broadcast synchronization signals (SSB, TRS) to its surrounding UEs. The broadcasted information can comprise the resource pool information. Other nodes can then sync to node-S and receive the broadcast information. When node-T has a V2X traffic data packet, it can send a scheduling request (SR) to node-S. The SR can comprise the following traffic types: V2X broadcast or multi-cast traffic, V2X unicast traffic then additionally indicate the receiver node, and/or cellular traffic.

Upon receiving the SR, node-S can schedule radio resources. The scheduling decision can be transmitted as downlink control information (DCI) from node-S to node-T and node-R. The DCI can comprise the resource allocation, MCS, precoder, etc. Upon receiving the DCI, node-T can transmit data on the allocated radio resource while node-R receives data on the allocated radio resource.

This disclosure proposes a three party communication method, where the control information is not necessarily sent to node-R from the node-S, but can be distributed to node-T. Thus, downlink control information (e.g., DCI-R) can be transmitted from node-T to node-R followed by the transmitted data traffic. The newly introduced DCI-R from node-T can be thought of as the second hop of control information from node-S, whereas node-S can send DCI-T to node-T, following a scheduling request, and node-T can use the allocated resources and other information included in DCI-T to send a DCI-R to the receiving node(s) followed by the transmitted data traffic.

This DCI-R is introduced in addition to the DCI-R that can be transmitted from node-S to node-R in the general framework as described above. The following steps describe this idea in more details. Node-S can broadcast synchronization signals (SSB, TRS) for surrounding nodes. The broadcasting information can comprise the resource pool information. Other nodes can then sync up with the node-S and receive the broadcast information. In the case of multiple node-S's present in proximity of each other, a semi-static coordination can be established between node-S's such that a resource pool coordination is established.

In another embodiment, the resource pool can be such that resources can be reused between node-S's in a low interference environment, and orthogonal in an edge, high interference environment. No dynamic coordination between multiple node-S's is assumed, such that different node-S's cannot coordinate the resource allocation and DCIs to ensure that data can be sent from node-T to node-R if it was not in the same group.

When a node-T has traffic to send, it can send a scheduling request (SR) to node-S that it is associated with. The scheduling request can comprise the traffic type: V2X broadcast or multi-cast traffic, V2X unicast traffic, that also indicates the receiver node, and/or cellular traffic. Upon receiving the SR, node-S can schedule radio resources. The scheduling decision can be transmitted as DCI (downlink control information) from node-S to node-T. The DCI-T transmitted to node-T can comprise resource allocation, MCS, precoder, etc. It can also comprise, in the payload, control information for the transmission from node-T to node-R. Upon receiving the DCI, node-T can transmit the DCI-R given the information included in the DCI-T from node-S and the resource allocation.

Control information (e.g., DCI-R, carried by a sidelink control channel), can contain information related to resource allocation, MCS, etc. for transmission from node-T to node-R. DCI-R can be transmitted from node-T to node-R. For the case of a unicast transmission, DCI-R can indicate the node-R, and can be decoded by node-R. For the case of a broadcast traffic, the DCI-R can broadcast to all surrounding UEs, while for multicast traffic, it can be transmitted to a designated group of nodes. DCI-R can be decoded using common search space used to receive DCI-R from corresponding node-S. The transmission of DCI-R from node-T can be followed by a data transmission from node-T to node-R on the allocated radio resource. Consequently, the proposed framework in this disclosure facilitates reliable V2X communication with limited coordination between local managers. This solution introduces a two-hop control between the local manager and the transmitter node, and the transmitter node and the receiver node, such that the reliability of the control channel does not suffer. The two-stage control between the local manager and the transmitter node, and the transmitter node and the receiver node, facilitates a more reliable communication in V2X. limited coordination or semi-static coordination between local managers can allow for coordination of the resource utilization to avoid frequent resource usage collision without sacrificing efficiency. Additionally, this solution facilitates transmitting nodes with limited reliability connection to a given node-S to transmit information reliably to their intended receivers. This solution allows nodes that belong to different local managers to communicate without relaying their information across multiple local managers In one embodiment, described herein is a first network device that can receive a scheduling request from a second network node device, wherein the scheduling request indicates that the second network node device is requesting to transmit data to a third network node device. The first network device can also determine first sidelink control information for the second network node device and second sidelink control information for the third network node device, wherein the first sidelink control information and the second sidelink control information facilitate a transmission of the data from the second network node device to the third network node device. Additionally, the first network device can transmit the first sidelink control information and the second sidelink control information to the second network node device, wherein the second sidelink control information is configured to be transmitted by the second network node device to the third network node device.

According to another embodiment, a method can comprise, transmitting, by a first network node device comprising a processor, a scheduling request to a scheduling network node device, wherein the scheduling request indicates that the first network node device requests a data transmission to a second network node device. The method can comprise receiving, by the first network node device, sidelink control information to facilitate the data transmission with the second network node device. Furthermore, the method can comprise transmitting, by the first network node device, a portion of the sidelink control information to the second network node device, wherein the portion of the sidelink control information schedules the data transmission.

According to yet another embodiment, described herein is a machine-readable storage medium that can perform the operations comprising facilitating transmitting scheduling request data representative of a scheduling request to a second network node device, wherein the scheduling request indicates that the first network node device requests a data transmission to a third network node device. The machine-readable storage medium can also perform the operations comprising facilitating receiving sidelink control data from the second network node device to facilitate the data transmission with the third network node device. Additionally, in response to the facilitating the receiving the sidelink control data, the machine-readable storage medium can facilitate transmitting a portion of the sidelink control data to the third network node device, wherein the portion of the sidelink control data schedules the data transmission.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102, 104 can be communicatively coupled to the wireless communication network via a network node 106. The network node (e.g., network node device) can communicate with user equipment (UE), thus providing connectivity between the UE and the wider cellular network. The UE 102 can send transmission type recommendation data to the network node 101 106. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 106. The dashed arrow lines from the network node 106 to the UE 102 represent downlink (DL) communications and the solid arrow lines from the UE 102 to the network nodes 106 represents an uplink (UL) communication.

System 100 can further include one or more communication service provider networks 108 that facilitate providing wireless communication services to various UEs, including UE 102, via the network node 106 and/or various additional network devices (not shown) included in the one or more communication service provider networks. The one or more communication service provider networks 108 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 108 can be or include the wireless communication network and/or various additional devices and components of the wireless communication network (e.g., additional network devices and cell, additional UEs, network server devices, etc.). The network node 106 can be connected to the one or more communication service provider networks 108 via one or more backhaul links. For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
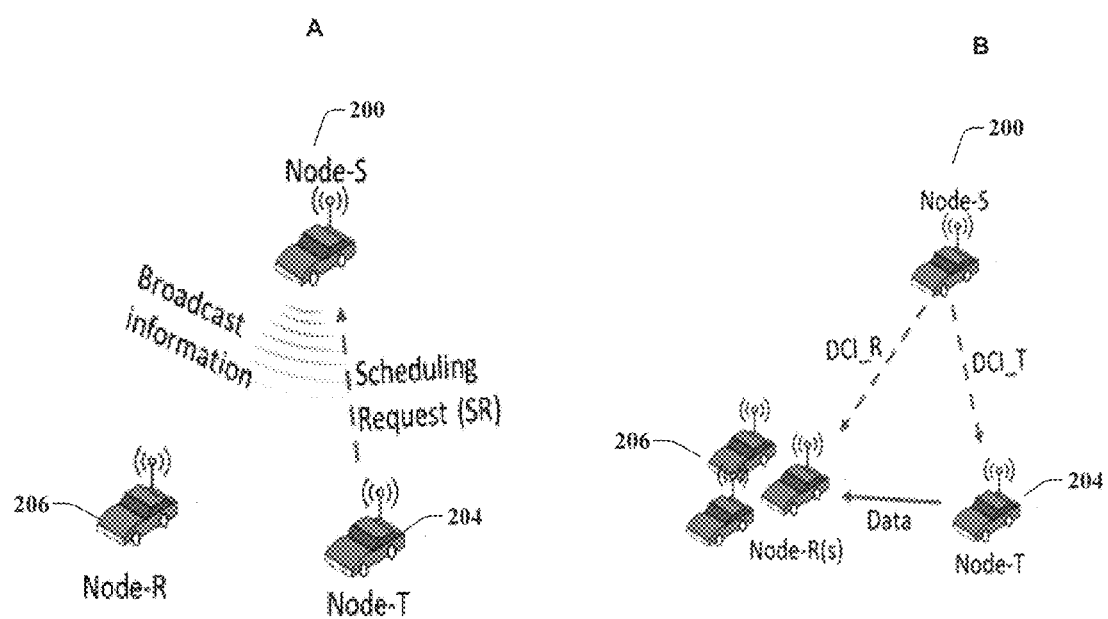
FIG. 2 illustrates an example block diagram for facilitating a general three-party communication procedure according to one or more embodiments.

Referring now to FIG. 2, illustrated is an example diagram for facilitating a general three-party communication procedure according to one or more embodiments. FIG. 2 depicts a scenario where node-S 200 denotes the local manager, and is responsible for the scheduling and resource allocation. Additionally, node-T 204 denotes the transmitting node, and node-R 206 denotes the receiving node. The system can be in a scheduling request phase (A) or a DCI data transmission phase (B).

Figure 3:
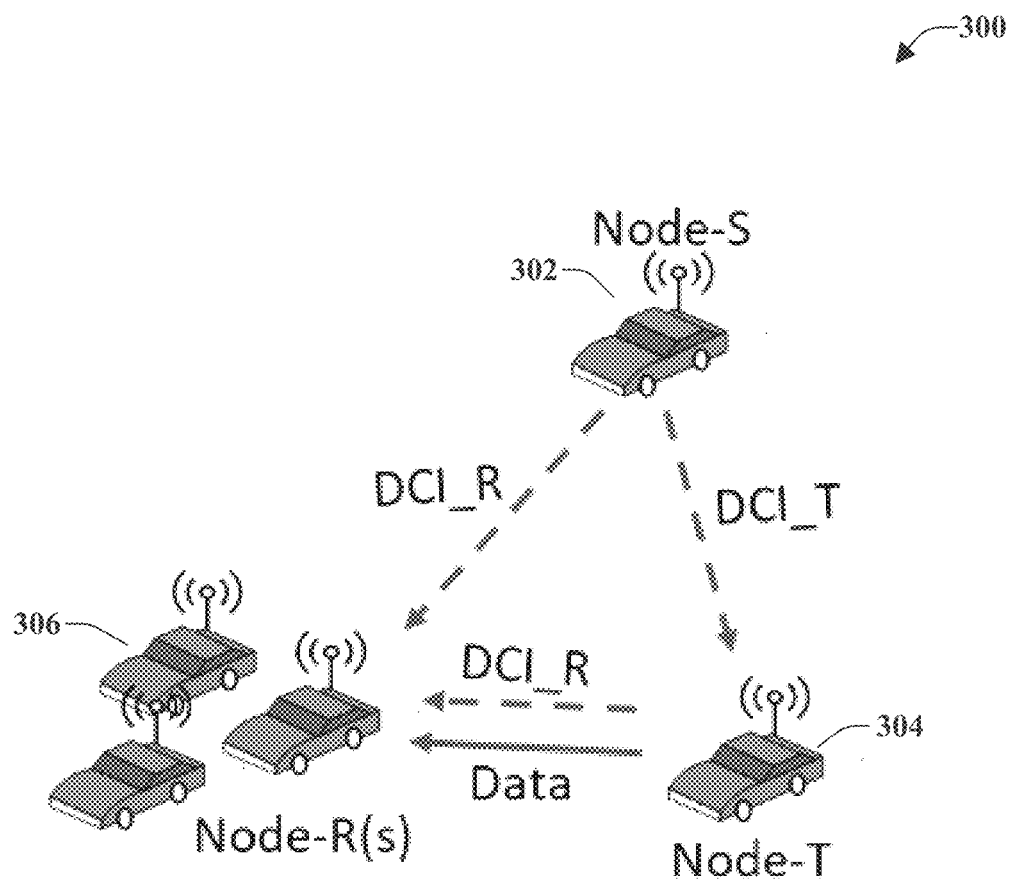
FIG. 3 illustrates an example block diagram for facilitating three party communication with distributed control for a 5G network according to one or more embodiments.
Figure 4:
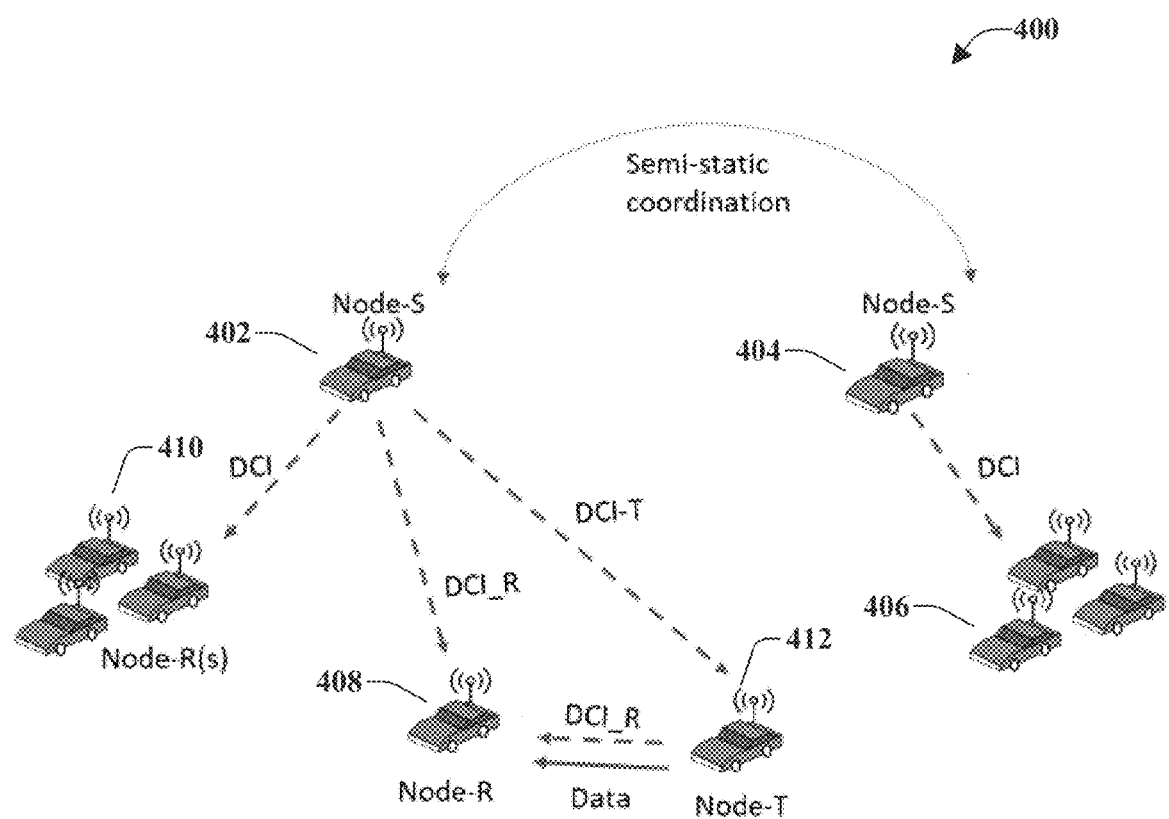
FIG. 4 illustrates an example block diagram for facilitating three party communication with distributed control across edge for a 5G network according to one or more embodiments.

Referring now to FIG. 3, illustrated is an example block diagram for facilitating three party communication with distributed control for a 5G network according to one or more embodiments. A node-S 302 can serve as the local manager for node-T 304 and node-Rs 306. Node-S 302 can receive a scheduling request from Node-T 304 indicating that Node-T 304 is requesting to make a data transmission to Node-R 306. In response to receiving the scheduling request, Node-S 302 can generate downlink control information DCI, although it can actually be considered sidelink control information (SCI-T) in other embodiments. Throughout the drawings, where DCI is depicted, this can also include sidelink information. Node-S 302 can transmit the SCI-T to Node-T 304. The SCI-T can also include information that Node-T can use to generate SCI-R to establish the data transmission with one or more of Node-Rs 306. The Node-T 304 can transmit the SCI-R to Node-R 306 and then establish the data transmission. As shown in FIG. 3, the SCI-R for node-R 306 can come exclusively from node-T 304, following the SCI-T from node-S 302 to node-T 304. In another alternative, SCI-R can come from both node-S 302 and node-T 304 to node-R 306 (for the case when node-S 302 knows the contents of SCI-R following the SR by node-T 304). This allows for improved reliability as it adds diversity by having the same information transmitted from two nodes Referring now to FIG. 4, illustrated is an example block diagram for facilitating three-party communication with distributed control across edge for a 5G network according to one or more embodiments. The proposed three-party communication framework in this disclosure can take into account the case when node-T 412 does not have a good link budget connection to a given node-S 402, either because of blockage or because of edge effect. Such an edge effect happens, for example, when node-T 412 is far enough from any node-S 402 to be reliably connected to it. This is illustrated in FIG. 4, where node-S 402 can also transmit SCI-R to node-R 408 as well as to Node-Rs 410. Node-S 402 can also be in semi-static coordination with node-S 404 which serves node 406.

Figure 5:
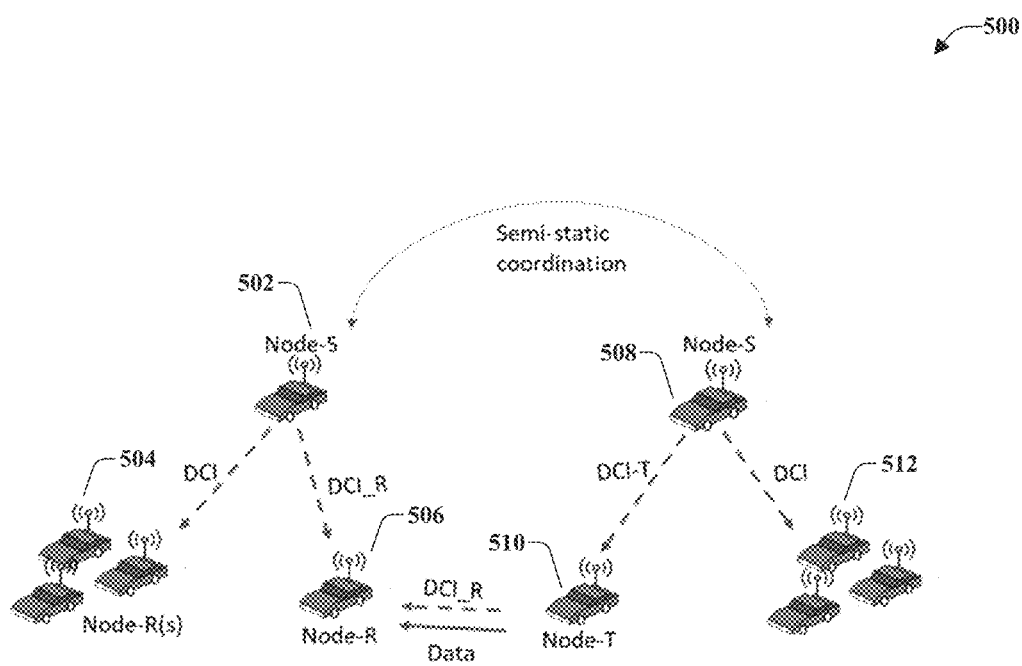
FIG. 5 illustrates an example block diagram for facilitating three party communication with distributed control across node-S for a 5G network based on a service grouping according to one or more embodiments.

Referring now to FIG. 5 illustrates an example block diagram for facilitating three party communication with distributed control across node-S for a 5G network based on a service grouping according to one or more embodiments. Another use case is when the node-R 506 belongs to a different node-S (node-S 502) than node-T 510 (which belongs to node-S 508) and the different node-Ss 502 and 508 are not dynamically coordinated, such that the control and data for node-R 506 cannot be relayed through another node-S. This use case is illustrated in FIG. 5. Node-S 502 can also provide SCI for Node-Rs 504, and node-S 508 can provide SCI for nodes 512.

Figure 6:
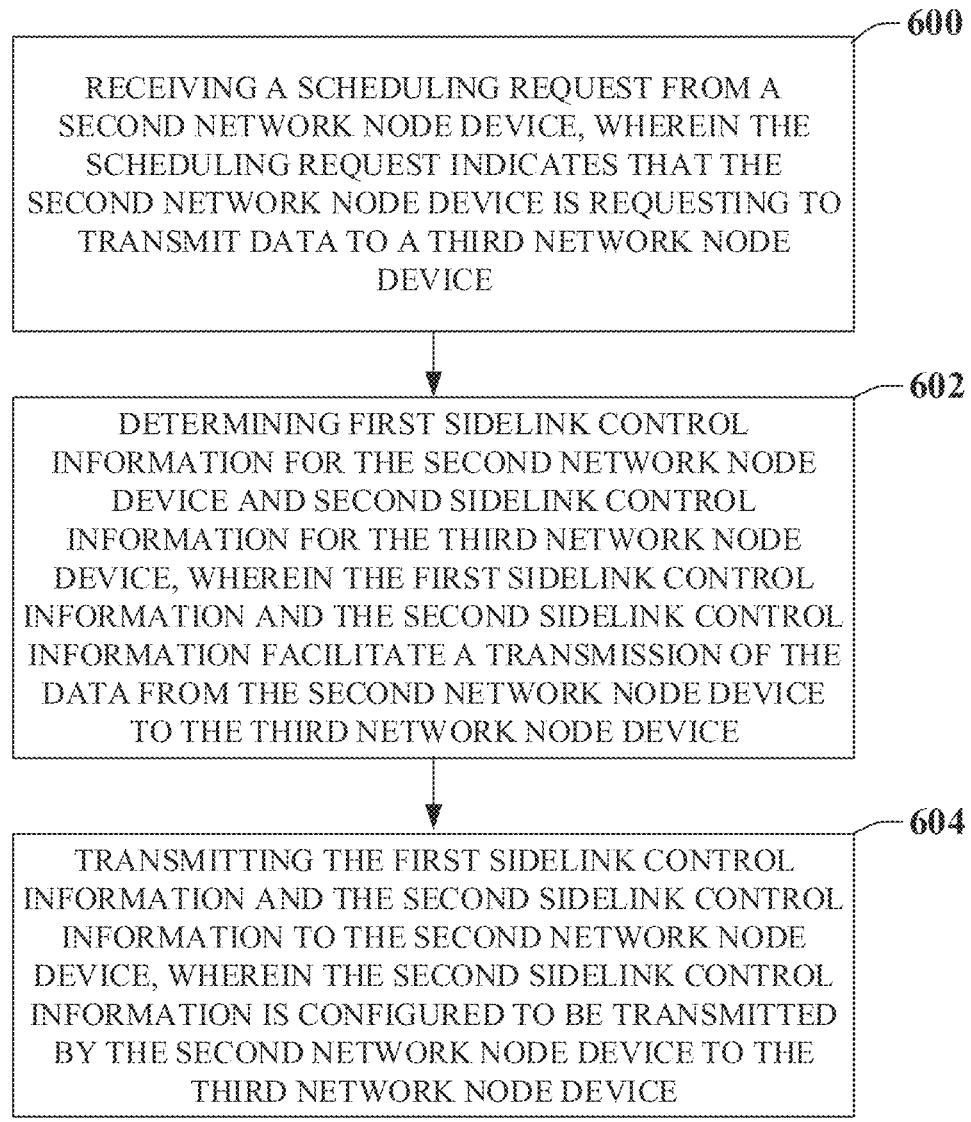
FIG. 6 illustrates an example flow diagram for a network device for facilitating distributed control information for multiple party information for a 5G network according to one or more embodiments.

Referring now to FIG. 6, illustrated is an example flow diagram for a network device for facilitating distributed control information for multiple party information for a 5G network according to one or more embodiments. At element 600, a first network device that can receive a scheduling request from a second network node device, wherein the scheduling request indicates that the second network node device is requesting to transmit data to a third network node device. At element 602, the first network device can also determine first sidelink control information for the second network node device and second sidelink control information for the third network node device, wherein the first sidelink control information and the second sidelink control information facilitate a transmission of the data from the second network node device to the third network node device. Additionally, at element 604, the first network device can transmit the first sidelink control information and the second sidelink control information to the second network node device, wherein the second sidelink control information is configured to be transmitted by the second network node device to the third network node device.

Figure 7:
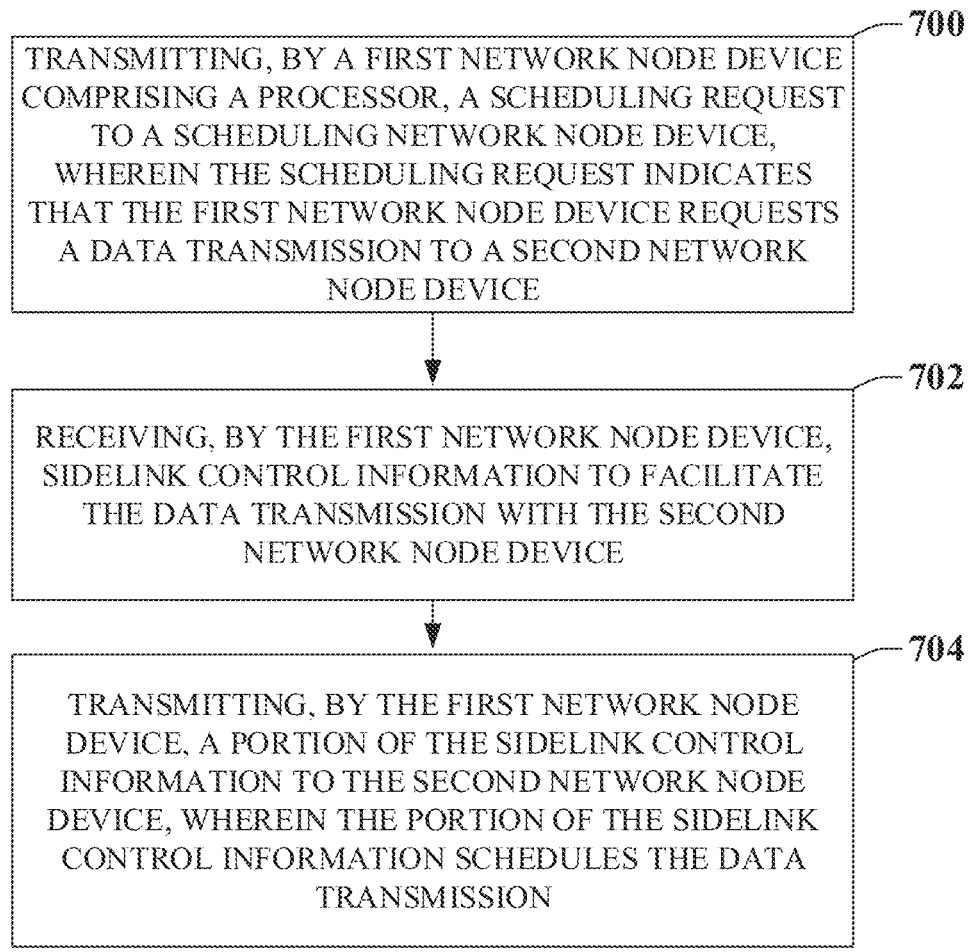
FIG. 7 illustrates an example flow diagram for a method for facilitating distributed control information for multiple party information for a 5G network according to one or more embodiments.

Referring now to FIG. 7, illustrated is an example flow diagram for a method for facilitating distributed control information for multiple party information for a 5G network according to one or more embodiments. At element 700, method can comprise, transmitting, by a first network node device comprising a processor, a scheduling request to a scheduling network node device, wherein the scheduling request indicates that the first network node device requests a data transmission to a second network node device. At element 702, the method can comprise receiving, by the first network node device, sidelink control information to facilitate the data transmission with the second network node device. Furthermore, at element 704, the method can comprise transmitting, by the first network node device, a portion of the sidelink control information to the second network node device, wherein the portion of the sidelink control information schedules the data transmission.

Figure 8:
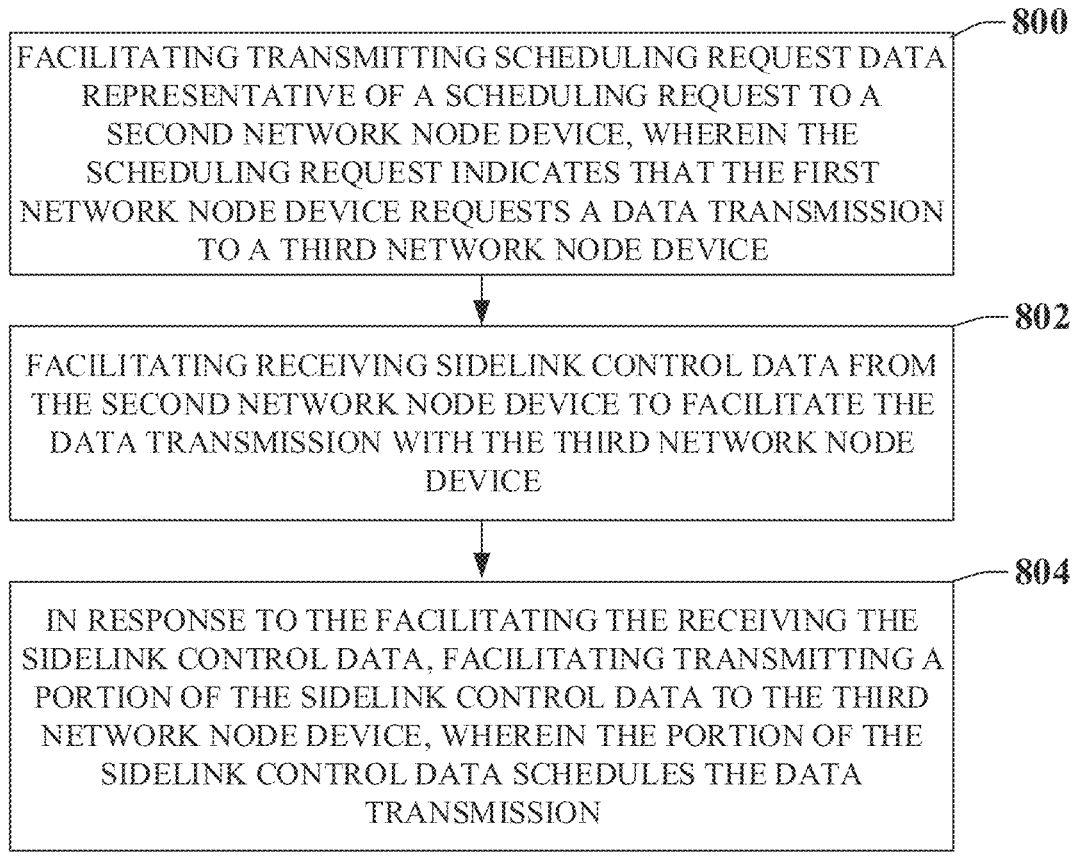
FIG. 8 illustrates an example flow diagram for a machine-readable medium for facilitating distributed control information for multiple party information for a 5G network according to one or more embodiments.

Referring now to FIG. 8, illustrated is an example flow diagram for a machine-readable medium for facilitating distributed control information for multiple party information for a 5G network according to one or more embodiments.

At element 800, a machine-readable storage medium that can perform the operations comprising facilitating transmitting scheduling request data representative of a scheduling request to a second network node device, wherein the scheduling request indicates that the first network node device requests a data transmission to a third network node device. At element 802, the machine-readable storage medium can also perform the operations comprising facilitating receiving sidelink control data from the second network node device to facilitate the data transmission with the third network node device. Additionally, in response to the facilitating the receiving the sidelink control data, at element 804, the machine-readable storage medium can facilitate transmitting a portion of the sidelink control data to the third network node device, wherein the portion of the sidelink control data schedules the data transmission.

Figure 9:
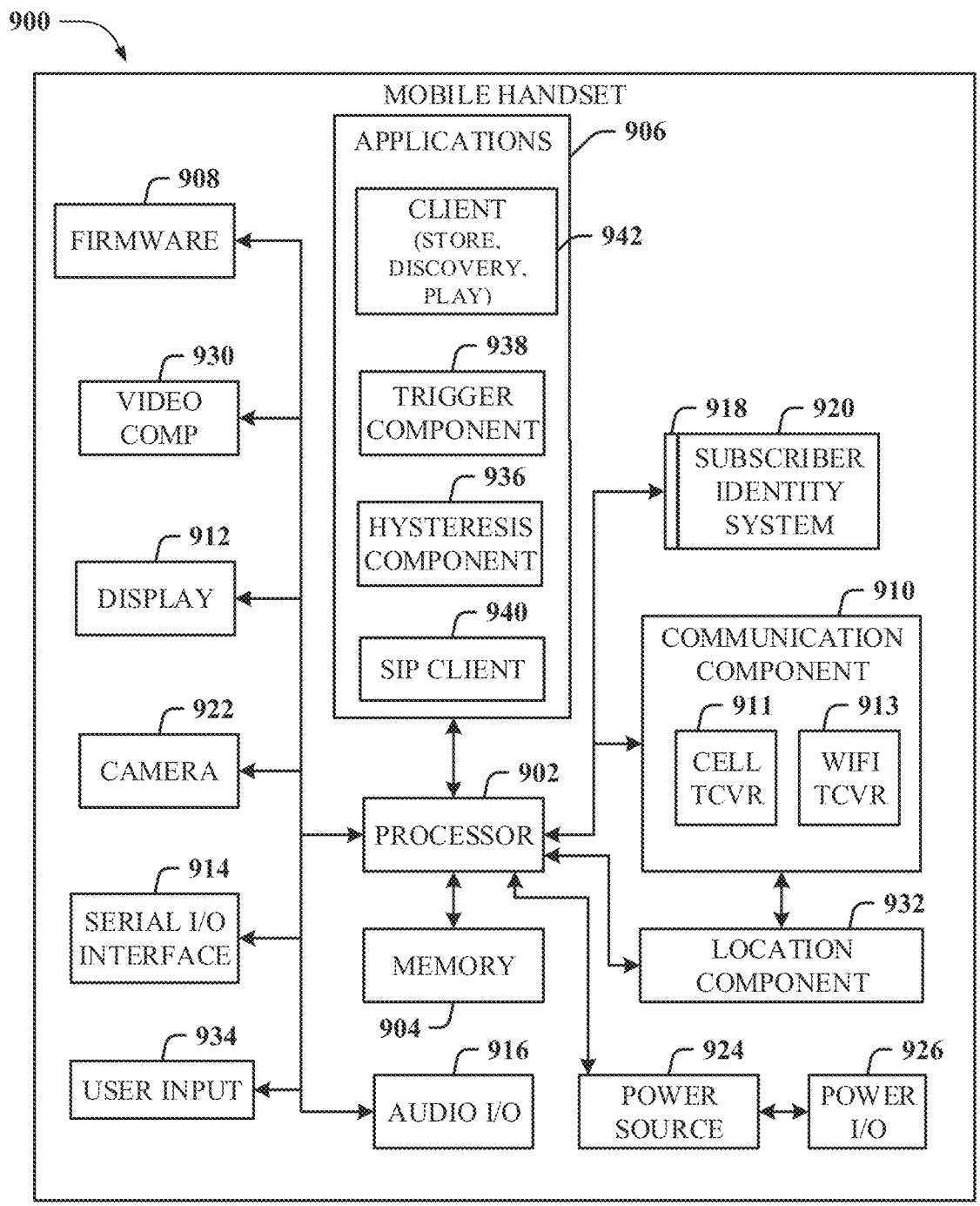
FIG. 9 illustrates an example block diagram of an example mobile handset operable to engage in a system architecture that facilitates secure wireless communication according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
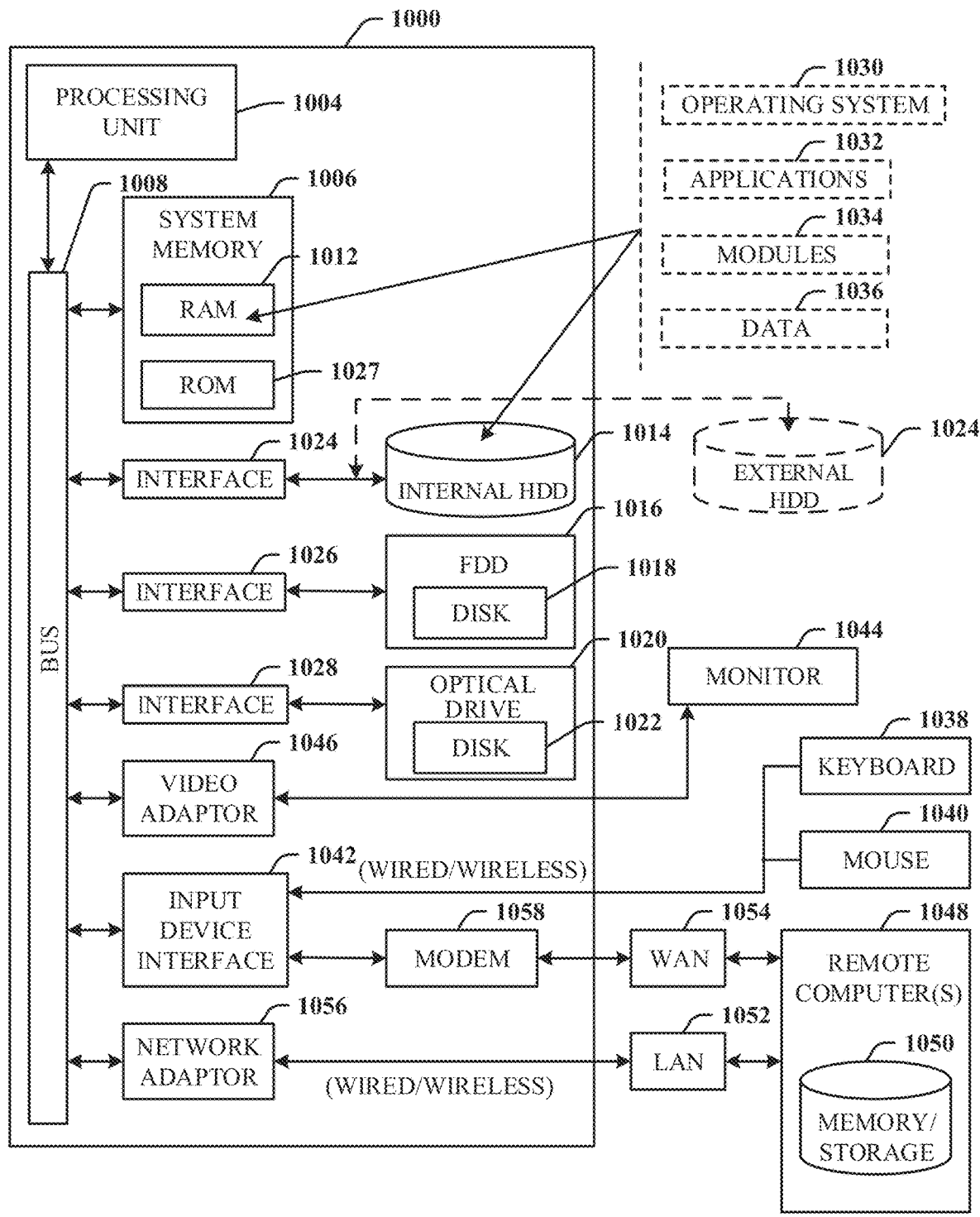
FIG. 10 illustrates an example block diagram of an example computer operable to engage in a system architecture that facilitates secure wireless communication according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 7 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. First network node equipment, comprising:
a processor; and
a memory that stores executable instructions that, when executed by the processor, facilitate performance of operations, comprising:
receiving a scheduling request from second network node equipment, wherein the scheduling request indicates that the second network node equipment is requesting to transmit data to third network node equipment, wherein the first network node equipment and the second network node equipment are in a first node group in which the first network node equipment is a first local manager of the first node group, and wherein the third network node equipment is in a second node group in which a fourth network node equipment is a second local manager of the second node group;
determining first sidelink control information for the second network node equipment and second sidelink control information for the third network node equipment, wherein the first sidelink control information and the second sidelink control information facilitate a transmission of the data from the second network node equipment to the third network node equipment;
transmitting the first sidelink control information and the second sidelink control information to the second network node equipment, wherein the second sidelink control information is configured to be transmitted by the second network node equipment to the third network node equipment; and
transmitting the first sidelink control information and the second sidelink control information to the third network node equipment based on a semi-static coordination with the fourth network node equipment of the second node group, wherein the semi-static coordination coordinates utilization of resources of a resource pool that is able to be reused between the first node group and the second node group in a low interference environment and orthogonally in a high interference environment, and wherein at least part of the first sidelink control information and the second sidelink control information is applicable to the transmission of the data from the second network node equipment to the third network node equipment.

2. The first network node equipment of claim 1, wherein the operations further comprise:
transmitting the second sidelink control information to the third network node equipment.

3. The first network node equipment of claim 1, wherein the first network node equipment, the second network node equipment, and the third network node equipment are respectively associated with a first vehicle, a second vehicle, and a third vehicle.

4. The first network node equipment of claim 1, wherein the operations further comprise:
transmitting a synchronization signal to the second network node equipment, wherein the synchronization signal comprises resource pool information that facilitates scheduling transmissions for the second network node equipment.

5. The first network node equipment of claim 1, wherein the first network node equipment is first scheduling node equipment, and the third network node equipment also receives at least part of the second sidelink control information from second scheduling node equipment.

6. The first network node equipment of claim 5, wherein the operations further comprise:
coordinating resource pool information with the second scheduling node equipment.

7. The first network node equipment of claim 1, wherein the scheduling request comprises information indicating whether the transmission of the data is an equipment specific transmission or a broadcast transmission.

8. A method, comprising:
transmitting, by a first user equipment comprising a processor, a scheduling request to a third user equipment, wherein the scheduling request indicates that the first user equipment has requested a data transmission to a second user equipment, wherein the first user equipment and the third user equipment are in a first group of user equipment in which the third user equipment is a first local manager of the first group, and wherein the second user equipment is in a second group of user equipment in which a fourth user equipment is a second local manager of the second group;
receiving, by the first user equipment, sidelink control information to facilitate the data transmission with the second user equipment; and
transmitting, by the first user equipment, a portion of the sidelink control information to the second user equipment, wherein the portion of the sidelink control information schedules the data transmission, wherein the transmitting is based on a semi-static coordination that coordinates utilization of resources of a resource pool that is able to be reused between the first group of user equipment and the second group of user equipment in a low interference environment and orthogonally in a high interference environment, and wherein the portion of the sidelink control information comprises control information to be used for the data transmission from the first user equipment to the second user equipment.

9. The method of claim 8, wherein the data transmission is via a side-link communication link.

10. The method of claim 8, wherein transmitting the scheduling request is in response to receiving a synchronization signal from the third user equipment.

11. The method of claim 8, wherein the operations further comprise:
transmitting additional sidelink control information generated by the first user equipment.

12. The method of claim 8, wherein the scheduling request comprises data indicative of whether the data transmission is associated with a vehicle.

13. The method of claim 8, wherein the scheduling request comprises data indicative of whether the data transmission is to be sent with a broadcast transmission.

14. The method of claim 8, wherein the data transmission comprises a transmission of resource data representative of a resource of the resources to be shared between the first user equipment and the second user equipment.

15. A non-transitory machine-readable medium, comprising executable instructions that, when executed by a processor of first network node equipment, facilitate performance of operations, comprising:
facilitating transmitting scheduling request data representative of a scheduling request to second network node equipment, wherein the scheduling request indicates that the first network node equipment has requested a data transmission to third network node equipment, wherein the first network node equipment and the second network node equipment are in a first group of network node equipment in which the second network node equipment is a first local manager of the first node group, and wherein the third network node equipment is in a second group of network node equipment in which a fourth network node equipment is a second local manager of the second node group;
facilitating receiving sidelink control data from the second network node equipment to facilitate the data transmission to the third network node equipment; and
in response to receiving the sidelink control data, facilitating transmitting a portion of the sidelink control data to the third network node equipment, wherein the portion of the sidelink control data schedules the data transmission, wherein the transmitting of the portion of the sidelink control data is based on a semi-static coordination of resources of a resource pool that is reusable between the first group of network node equipment and the second group of network node equipment in a low interference environment and orthogonally in a high interference environment, performed by the second network node equipment and the fourth network node equipment, and wherein facilitating the transmitting of the portion of the sidelink control data to the third network node equipment comprises facilitating the transmitting of control information to be applied to the data transmission from the first network node equipment to the third network node equipment.

16. The non-transitory machine-readable medium of claim 15, wherein second network node equipment comprises scheduling network node equipment, and wherein the third network node equipment also receives sidelink control data from the scheduling network node equipment.

17. The non-transitory machine-readable medium of claim 15, wherein the operations further comprise:
facilitating coordinating resource pool data between the first network node equipment and the third network node equipment.

18. The non-transitory machine-readable medium of claim 15, wherein the first network node equipment is associated with a vehicle.

19. The non-transitory machine-readable medium of claim 18, wherein the vehicle is a first vehicle, and wherein the third network node equipment is associated with a second vehicle.

20. The non-transitory machine-readable medium of claim 15, wherein the sidelink control data is first sidelink data, and wherein the operations further comprise:
facilitating second sidelink data, to be sent from the second network node equipment to the third network node equipment.

* * * * *